US012809429B2

(12) United States Patent
Wu et al.

(10) Patent No.: US 12,809,429 B2
(45) Date of Patent: Nov. 24, 2026

(54) HIGH DENSITY COMMON FOOTPRINT ELECTRONIC CIRCUIT BREAKER

(71) Applicant: Dell Products L.P., Round Rock, TX (US)

(72) Inventors: Feng-Yu Wu, Taipei City (TW); Hang Li, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 121 days.

(21) Appl. No.: 19/044,948

(22) Filed: Feb. 4, 2025

(65) Prior Publication Data

US 2026/0227831 A1 Aug. 6, 2026

(51) Int. Cl.
*G06F 1/18* (2026.01)

(52) U.S. Cl.
CPC .................................... *G06F 1/189* (2013.01)

(58) Field of Classification Search
CPC ... G06F 1/189; G06F 1/26; G06F 1/20; G06F 1/263; G06F 1/181; G06F 1/266; G06F 1/18; G06F 1/188; G06F 1/182; G06F 1/28; G06F 1/30; G06F 1/185; G06F 1/1632; G06F 1/1626; G06F 1/206; G06F 1/3287; G06F 1/1637; G06F 1/1601; G06F 1/1652; G06F 1/184; H05K 1/181; H05K 1/18
See application file for complete search history.

(56) References Cited

U.S. PATENT DOCUMENTS 5,613,033 A * 3/1997 Swamy .................. H01R 12/00 361/791
8,462,511 B2 * 6/2013 Lee .......................... H05K 7/20 361/720
8,508,954 B2 * 8/2013 Kwon .................. H10W 42/20 361/795
2011/0013373 A1 * 1/2011 Lin ........................ H05K 1/145 29/854
2012/0002455 A1 * 1/2012 Sullivan .................... G06F 1/10 365/51

(Continued)

FOREIGN PATENT DOCUMENTS

WO WO-2024202842 A1 * 10/2024 .......... H01M 50/569

*Primary Examiner* — Abhishek M Rathod
(74) *Attorney, Agent, or Firm* — Jackson Walker L.L.P.

(57) ABSTRACT

An information handling system may include a circuit board, a plurality of information handling resources electrically and mechanically coupled to the circuit board, a power system electrically coupled to the plurality of information handling resources and configured to provide electrical energy to the plurality of information handling resources, a first electronic circuit breaker electrically coupled between the power system and the plurality of information handling resources, and a second electronic circuit breaker electrically coupled between the power system and the plurality of information handling resources and arranged electrically in parallel with the first electronic circuit breaker. The first electronic circuit breaker and the second electronic circuit breaker may be arranged relative to one another and the circuit board such that functionally equivalent pins of the first electronic circuit breaker and the second electronic circuit breaker have a common footprint relative to mounting surfaces of the circuit board.

13 Claims, 5 Drawing Sheets

(56) References Cited

U.S. PATENT DOCUMENTS

| | | | | |
|---|---|---|---|---|
| 2014/0168908 | A1* | 6/2014 | Chuang | H04M 1/00 361/735 |
| 2015/0372597 | A1* | 12/2015 | Luo | H02M 3/157 323/271 |
| 2023/0225077 | A1* | 7/2023 | Sweeney, II | G06F 1/206 361/679.47 |

* cited by examiner

HIGH DENSITY COMMON FOOTPRINT ELECTRONIC CIRCUIT BREAKER

TECHNICAL FIELD

The present disclosure relates in general to information handling systems, and more specifically to methods and systems for locating two electrically parallel electronic circuit breaker integrated circuit packages.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often employ one or more circuit boards. A circuit board may broadly refer to a printed circuit board (PCB), printed wiring board (PWB), printed wiring assembly (PWA) etched wiring board, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board. A circuit board may be used to implement a motherboard, a riser card, a mezzanine card, a paddle card, and/or many other components of an information handling system.

To prevent electrical fault conditions on a circuit board, such as an overcurrent condition that may damage the circuit board or components mounted on a circuit board, one or more electronic circuit breakers (sometimes referred to as e-fuses) implemented within integrated circuit packages may be mounted to the circuit board and electrically coupled within one or more critical electrical paths of the circuit board. In the event of an electrical fault within an electrical path, one or more of the electronic circuit breakers may trip, causing electrical current to cease flowing in the electrical path, and preventing damage to electrical and electronic components of the circuit board.

In certain higher-power applications, two (or more) electronic circuit breakers may be arranged electrically in parallel, to increase the level of current that causes a trip beyond that of a single electronic circuit breaker. However, placement of the multiple electrically parallel electronic circuit breakers on a single circuit board may present challenges, including the need for circuit board surface area for mounting the multiple electrically parallel electronic circuit breakers and any necessary routing of circuit board traces. Accordingly, systems and methods for mounting two electronic circuit breakers while minimizing circuit board area and circuit board routing may be desired.

SUMMARY

In accordance with the teachings of the present disclosure, the disadvantages and problems associated with detecting strain-induced open circuits on a circuit board may be reduced or eliminated.

In accordance with embodiments of the present disclosure, an information handling system may include a circuit board, a plurality of information handling resources electrically and mechanically coupled to the circuit board, a power system electrically coupled to the plurality of information handling resources and configured to provide electrical energy to the plurality of information handling resources, a first electronic circuit breaker electrically coupled between the power system and the plurality of information handling resources, and a second electronic circuit breaker electrically coupled between the power system and the plurality of information handling resources and arranged electrically in parallel with the first electronic circuit breaker. The first electronic circuit breaker and the second electronic circuit breaker may be arranged relative to one another and the circuit board such that functionally equivalent pins of the first electronic circuit breaker and the second electronic circuit breaker have a common footprint relative to mounting surfaces of the circuit board.

In accordance with these and other embodiments of the present disclosure, a system may include a first electronic circuit breaker electrically coupled to the circuit board and a second electronic circuit breaker electrically coupled to the circuit board and arranged electrically in parallel with the first electronic circuit breaker. The first electronic circuit breaker and the second electronic circuit breaker may be arranged relative to one another and the circuit board such that functionally equivalent pins of the first electronic circuit breaker and the second electronic circuit breaker have a common footprint relative to mounting surfaces of the circuit board.

In accordance with these and other embodiments of the present disclosure, a method may include electrically coupling a first electronic circuit breaker to a circuit board, electrically coupling a second electronic circuit breaker to the circuit board such that the second electronic breaker is electrically in parallel with the first electronic circuit breaker, and arranging the first electronic circuit breaker and the second electronic circuit breaker relative to one another and the circuit board such that functionally equivalent pins of the first electronic circuit breaker and the second electronic circuit breaker have a common footprint relative to mounting surfaces of the circuit board.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
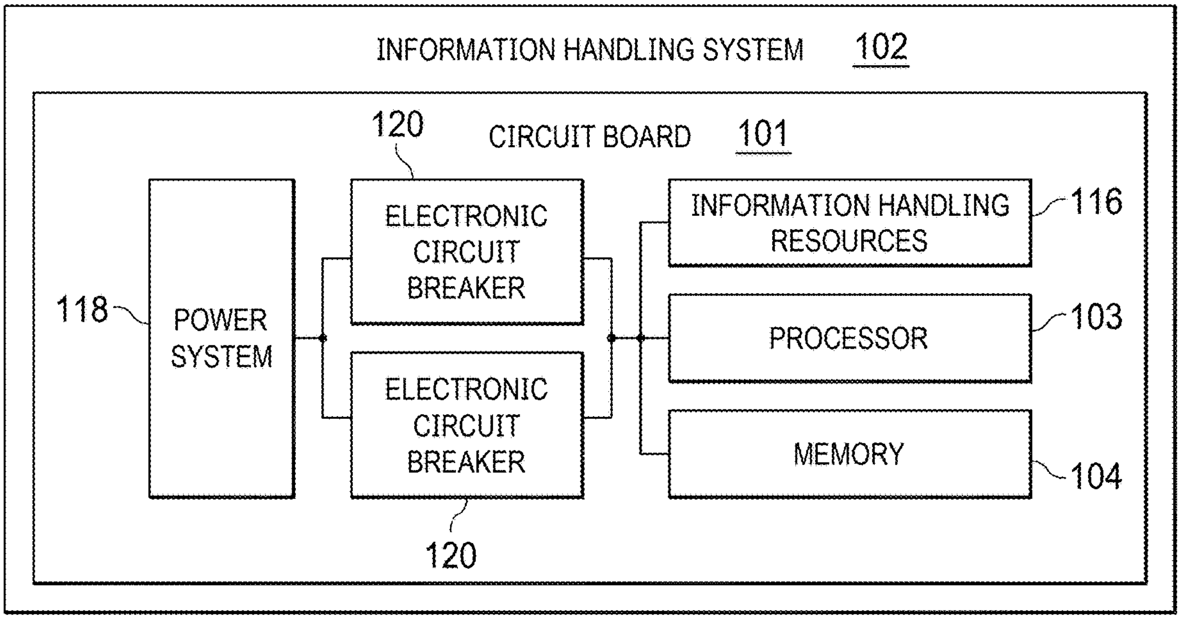
FIG. 1 illustrates a block diagram of selected components of an example information handling system, in accordance with certain embodiments of the present disclosure.

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, BIOSs, buses, memories, I/O devices and/or interfaces, storage resources, network interfaces, motherboards, and/or any other components and/or elements of an information handling system.

For the purposes of this disclosure, a circuit board may broadly refer to a printed circuit board (PCB), printed wiring board (PWB), printed wiring assembly (PWA) etched wiring board, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

FIG. 1 illustrates a block diagram of selected components of an example information handling system 102, in accordance with certain embodiments of the present disclosure. It is noted that the various components depicted in FIG. 1 may not be drawn to scale.

In some embodiments, information handling system 102 may comprise a server. In other embodiments, information handling system 102 may be a personal computer (e.g., a desktop computer, a laptop, notebook, tablet, handheld, smart phone, personal digital assistant, etc.). As depicted in FIG. 1, information handling system 102 may include a circuit board 101 (e.g., a motherboard or backplane) having mounted and/or formed thereon a processor 103, a memory 104 communicatively coupled to processor 103, information handling resources 116 communicatively coupled to processor 103, a power system 118 for generating electrical energy to operate components of information handling system 102, and electronic circuit breakers 120 coupled electrically in parallel with one other and interfaced between power system 118 and one or more components of information handling system 102 powered from power system 118. Notably, for the purposes of clarity and exposition, power system 118 is shown as being formed on circuit board 101, although some components of power system 118 (e.g., power supply units) may reside off of circuit board 101.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Generally speaking, information handling resources 116 may include any component system, device or apparatus of information handling system 102, including without limitation processors, graphics processing units, buses, computer-readable media, input-output devices and/or interfaces, storage resources, network interfaces, motherboards, electro-mechanical devices (e.g., fans), displays, and/or power supplies.

Generally speaking, power system 118 may include any system, device, or apparatus configured to supply electrical current to processor 103, memory 104, and/or one or more information handling resources 116.

An electronic circuit breaker 120 may include any system, device, or apparatus configured to protect an electrical circuit from damage caused by current in excess of that which the equipment can safely carry (e.g., overcurrent). Accordingly, an electronic circuit breaker 120 may interrupt current flow to protect components of information handling system 102 from damage and/or to prevent other undesirable conditions (e.g., fires). In some instances, an electronic circuit breaker 120 may be reset (either manually or automatically) to resume normal operation. Each electronic circuit breaker 120 may be implemented as an integrated circuit package configured to electrically and mechanically couple to circuit board 101.

In addition to circuit board 101, processor 103, memory 104, information handling resources 116, power system 118, and electronic circuit breakers 120, information handling system 102 may include one or more other information handling resources.

Figure 2:
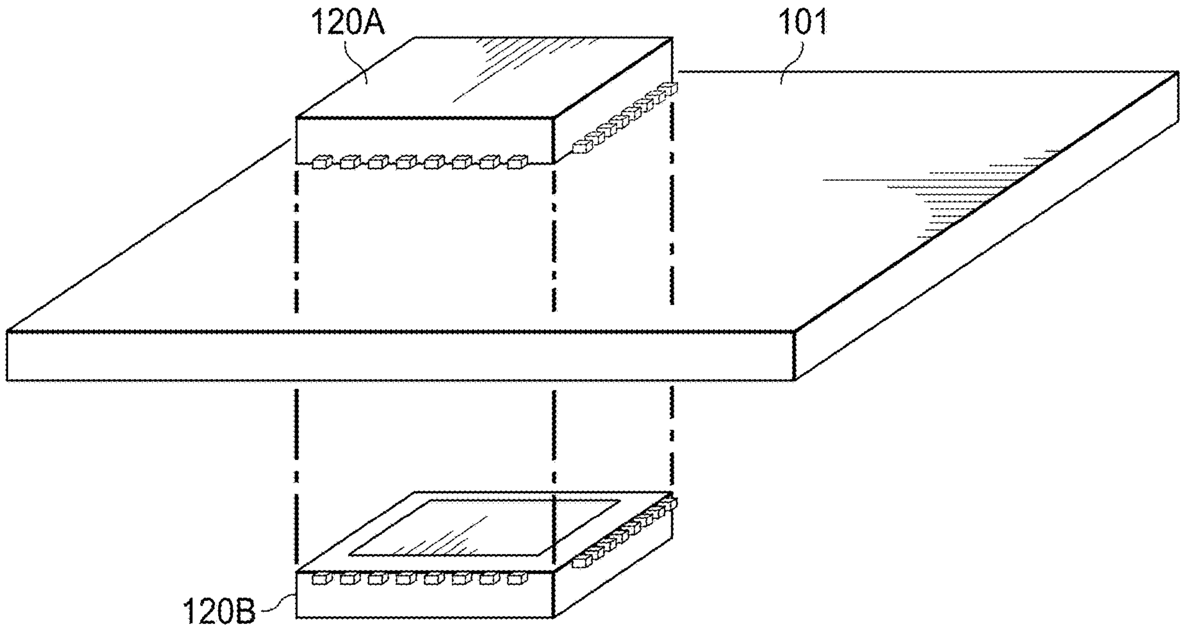
FIG. 2 illustrates an exploded side isometric perspective view of a circuit board with two electronic circuit breakers mounted on opposite sides thereof, in accordance with certain embodiments of the present disclosure.

FIG. 2 illustrates an exploded side isometric perspective view of circuit board 101 with electronic circuit breakers 120A and 120B mounted on opposite sides thereof, in accordance with certain embodiments of the present disclosure. In particular, first electronic circuit breaker 120A may be mounted on a first surface of circuit board 101 and second electronic circuit breaker 120B may be mounted on a second surface of circuit board 101 substantially (e.g., within manufacturing tolerances) directly opposite of first electronic circuit breaker 120A.

Such arrangement of electronic circuit breakers 120A and 120B on opposite surfaces may save circuit space as compared to placing electronic circuit breakers 120A and 120B on the same surface of circuit board 101. However, if first electronic circuit breaker 120A and second electronic circuit breaker 120B are identical (e.g., have the same pinout), cross-signal traces may be required between corresponding pins of first electronic circuit breaker 120A and second electronic circuit breaker 120B in order to ensure electrically parallel operation of first electronic circuit breaker 120A and second electronic circuit breaker 120B. Some or all of such cross-signal traces may span entirely across the footprint of first electronic circuit breaker 120A and second electronic circuit breaker 120B, requiring significant space in circuit board 101 for such electrical routing.

Figure 3A:
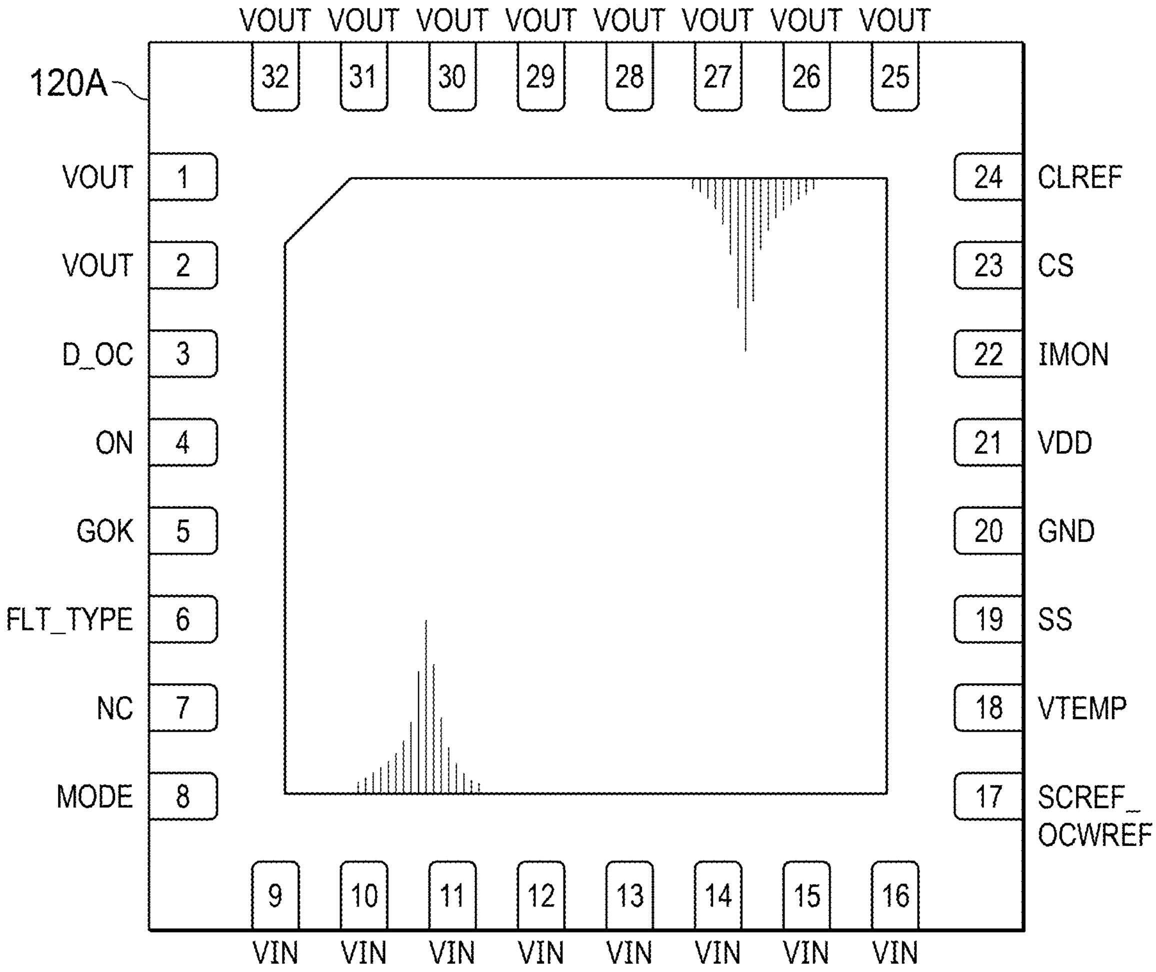
FIG. 3A illustrates a top-down plan view of an example pinout of a first of the two electronic circuit breakers depicted in FIG. 2, in accordance with embodiments of the present disclosure.
Figure 3B:
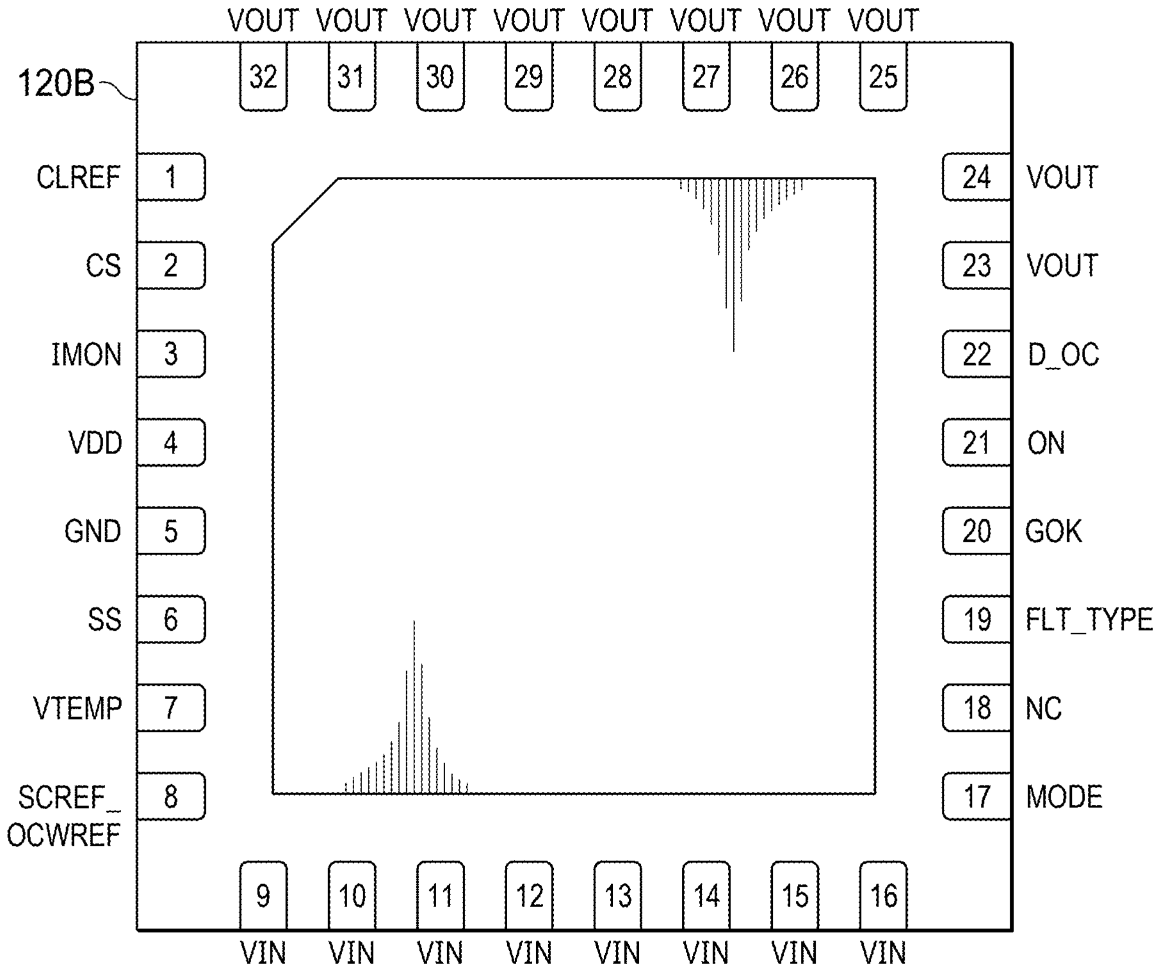
FIG. 3B illustrates a top-down plan view of an example pinout of a second of the two electronic circuit breakers depicted in FIG. 2, in accordance with embodiments of the present disclosure.
Figure 4:
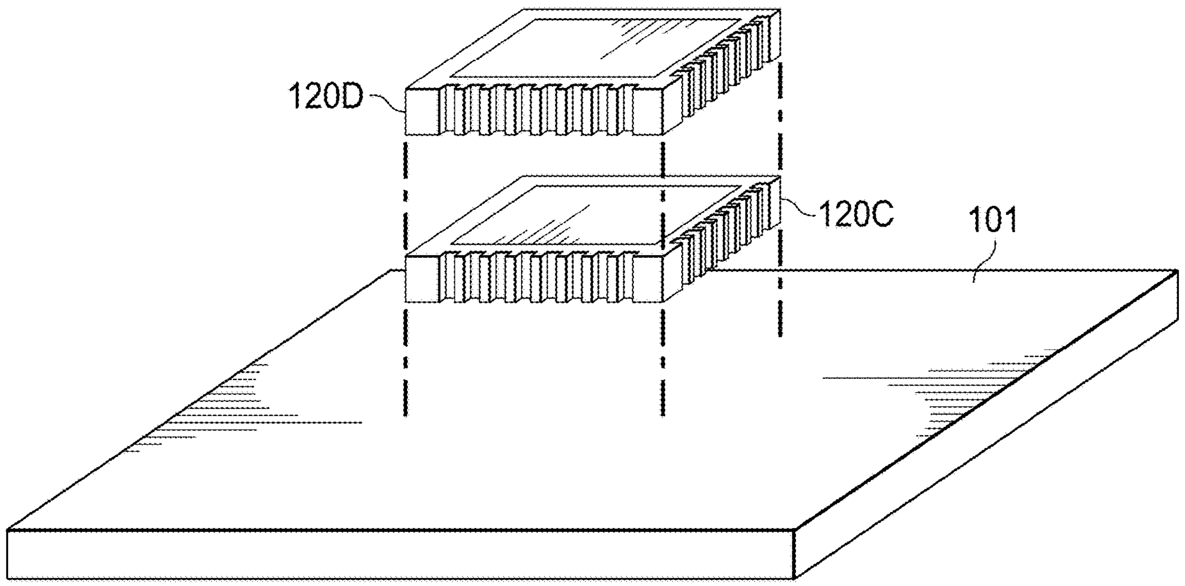
FIG. 4 illustrates an exploded side isometric perspective view of a circuit board with a first electronic circuit breaker mounted on the circuit board, with a second electronic circuit breaker mounted on the first electronic circuit breaker, in accordance with certain embodiments of the present disclosure.

Accordingly, to eliminate or reduce such cross-signal traces, the pinouts of first electronic circuit breaker 120A and second electronic circuit breaker 120B may be mirrored from one another. To illustrate, FIG. 3A illustrates a top-down plan view of an example pinout of first electronic circuit breaker 120A, in accordance with embodiments of the present disclosure, while FIG. 3B illustrates a top-down plan view of an example pinout of second electronic circuit breaker 120B, in accordance with embodiments of the present disclosure.

Thus, when first electronic circuit breaker 120A and second electronic circuit breaker 120B are mounted substantially (e.g., within manufacturing tolerances) directly opposite of one another on opposite surfaces of circuit board 101, each pin of first electronic circuit breaker 120A may have the same footprint upon circuit board 101 as its functionally equivalent pin of second electronic circuit breaker 120B, thus minimizing or eliminating cross-traces between pins of first electronic circuit breaker 120A and second electronic circuit breaker 120B.

As an alternative approach to that described above, FIG. 4 illustrates an exploded side isometric perspective view of a circuit board 101 with a first electronic circuit breaker 102C mounted on circuit board 101, with a second electronic circuit breaker 102D mounted on first electronic circuit breaker 102C, in accordance with certain embodiments of the present disclosure. In the arrangement shown in FIG. 4, first electronic circuit breaker 102C and second electronic circuit breaker 102D may be identical or substantially identical (e.g., have the same pinout) and the packages of each of first electronic circuit breaker 102C and second electronic circuit breaker 102D may be configured to allow each pin of first electronic circuit breaker 102C to electrically couple to its functionally equivalent pin of second electronic circuit breaker 120D when second electronic circuit breaker 120D is mounted on top of first electronic circuit breaker 102C (or vice versa in some instances). Accordingly, cross-traces between pins of first electronic circuit breaker 120C and second electronic circuit breaker 120D may be minimized or eliminated. Thus, similar to the arrangement shown in FIGS. 2, 3A, and 3B, in the arrangement of FIG. 4, functionally equivalent pins of the electronic circuit breakers 120 have a common footprint relative to mounting surfaces of circuit board 101.

While the terms “top,” “bottom,” “front,” “back,” and “side” are used for purposes of exposition and clarity, such terms are not intended to limit any of the components disclosed herein to a particular orientation or configuration.

As used herein, when two or more elements are referred to as “coupled” to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:

a circuit board;

a plurality of information handling resources electrically and mechanically coupled to the circuit board;

a power system electrically coupled to the plurality of information handling resources and configured to provide electrical energy to the plurality of information handling resources;

a first electronic circuit breaker electrically coupled between the power system and the plurality of information handling resources; and a second electronic circuit breaker electrically coupled between the power system and the plurality of information handling resources and arranged electrically in parallel with the first electronic circuit breaker;

wherein the first electronic circuit breaker and the second electronic circuit breaker are arranged relative to one another and the circuit board such that functionally equivalent pins of the first electronic circuit breaker and the second electronic circuit breaker have a common footprint relative to mounting surfaces of the circuit board.

2. The information handling system of claim 1, wherein:

the first electronic circuit breaker is mounted upon a first surface of the circuit board;

the second electronic circuit breaker is mounted upon a second surface of the circuit board substantially directly opposite of the first electronic circuit breaker; and a pinout of the first electronic circuit breaker is mirrored relative to a pinout of the second electronic circuit breaker.

3. The information handling system of claim 1, wherein:

the first electronic circuit breaker is mounted upon a surface of the circuit board;

the second electronic circuit breaker is mounted upon the first electronic circuit breaker; and packages of each of the first electronic circuit breaker and the second electronic circuit breaker are configured to allow each pin of the first electronic circuit breaker to electrically couple to its functionally equivalent pin of the second electronic circuit breaker when the second electronic circuit breaker is mounted on top of the first electronic circuit breaker.

4. The information handling system of claim 1, wherein the circuit board comprises a motherboard.

5. A system, comprising:

a first electronic circuit breaker electrically coupled to the circuit board; and a second electronic circuit breaker electrically coupled to the circuit board and arranged electrically in parallel with the first electronic circuit breaker;

wherein the first electronic circuit breaker and the second electronic circuit breaker are arranged relative to one another and the circuit board such that functionally equivalent pins of the first electronic circuit breaker and the second electronic circuit breaker have a common footprint relative to mounting surfaces of the circuit board.

6. The system of claim 5, wherein:

the first electronic circuit breaker is mounted upon a first surface of the circuit board;

the second electronic circuit breaker is mounted upon a second surface of the circuit board substantially directly opposite of the first electronic circuit breaker; and a pinout of the first electronic circuit breaker is mirrored relative to a pinout of the second electronic circuit breaker.

7. The system of claim 5, wherein:

the first electronic circuit breaker is mounted upon a surface of the circuit board;

the second electronic circuit breaker is mounted upon the first electronic circuit breaker; and packages of each of the first electronic circuit breaker and the second electronic circuit breaker are configured to allow each pin of the first electronic circuit breaker to electrically couple to its functionally equivalent pin of the second electronic circuit breaker when the second electronic circuit breaker is mounted on top of the first electronic circuit breaker.

8. The system of claim 5, wherein the circuit board comprises a motherboard.

9. A method, comprising:

electrically coupling a first electronic circuit breaker to a circuit board;

electrically coupling a second electronic circuit breaker to the circuit board such that the second electronic breaker is electrically in parallel with the first electronic circuit breaker; and arranging the first electronic circuit breaker and the second electronic circuit breaker relative to one another and the circuit board such that functionally equivalent pins of the first electronic circuit breaker and the second electronic circuit breaker have a common footprint relative to mounting surfaces of the circuit board.

10. The method of claim 9, wherein arranging the first electronic circuit breaker and the second electronic circuit breaker relative to one another and the circuit board comprises:

mounting the first electronic circuit breaker upon a first surface of the circuit board; and mounting the second electronic circuit breaker upon a second surface of the circuit board substantially directly opposite of the first electronic circuit breaker;

wherein a pinout of the first electronic circuit breaker is mirrored relative to a pinout of the second electronic circuit breaker.

11. The method of claim 9, wherein arranging the first electronic circuit breaker and the second electronic circuit breaker relative to one another and the circuit board comprises:

mounting the first electronic circuit breaker upon a surface of the circuit board; and mounting the second electronic circuit breaker upon the first electronic circuit breaker;

wherein packages of each of the first electronic circuit breaker and the second electronic circuit breaker are configured to allow each pin of the first electronic circuit breaker to electrically couple to its functionally equivalent pin of the second electronic circuit breaker when the second electronic circuit breaker is mounted on top of the first electronic circuit breaker.

12. The method of claim 9, wherein the circuit board comprises a motherboard.

13. The method of claim 9, further comprising electrically coupling the first electronic circuit breaker and the second electronic circuit breaker between a power system and a plurality of information handling resources.

* * * * *